(12) United States Patent
Takahashi et al.

(10) Patent No.: US 8,276,804 B2
(45) Date of Patent: Oct. 2, 2012

(54) MANUFACTURING METHOD OF FUEL TANK, AND FUEL TANK

(75) Inventors: Yasuo Takahashi, Narashino (JP); Toshinori Mizuguchi, Tokyo (JP); Hirohumi Kondo, Fuji (JP); Shinji Shiokawa, Fujinomiya (JP); Yukikazu Takahashi, Fuji (JP); Nobuhide Suzuki, Fuji (JP)

(73) Assignees: Nippon Steel Corporation, Tokyo (JP); Unipres Corporation, Kanagawa (JP)

( * ) Notice: Subject to any disclaimer, the term of this patent is extended or adjusted under 35 U.S.C. 154(b) by 0 days.

(21) Appl. No.: 12/451,862

(22) PCT Filed: Jun. 5, 2008

(86) PCT No.: PCT/JP2008/060355
§ 371 (c)(1),
(2), (4) Date: Dec. 2, 2009

(87) PCT Pub. No.: WO2008/149924
PCT Pub. Date: Dec. 11, 2008

(65) Prior Publication Data
US 2010/0116828 A1    May 13, 2010

(30) Foreign Application Priority Data
Jun. 7, 2007    (JP) .................................. 2007-151056

(51) Int. Cl.
*B23K 31/02*    (2006.01)
*B23K 11/06*    (2006.01)

(52) U.S. Cl. .......................................... 228/184; 219/83
(58) Field of Classification Search .................... None
See application file for complete search history.

(56) References Cited

U.S. PATENT DOCUMENTS

| | | | | |
|---|---|---|---|---|
| 3,779,420 A | * | 12/1973 | Knaus | 220/4.14 |
| 4,334,138 A | * | 6/1982 | Matsuno et al. | 219/64 |
| 4,568,070 A | * | 2/1986 | Severt | 269/60 |
| 4,595,326 A | * | 6/1986 | Matsuno et al. | 413/1 |
| 4,661,673 A | * | 4/1987 | Geiermann | 219/64 |
| 4,756,069 A | * | 7/1988 | Morikawa | 29/463 |
| 4,785,153 A | * | 11/1988 | Stimmel | 219/86.41 |
| 5,010,226 A | * | 4/1991 | Sato et al. | 219/81 |
| 6,069,337 A | * | 5/2000 | Takase et al. | 219/83 |
| 2004/0134892 A1 | | 7/2004 | Kido et al. | |
| 2004/0256366 A1 | * | 12/2004 | Kim et al. | 219/121.63 |
| 2005/0224467 A1 | * | 10/2005 | Val et al. | 219/83 |

FOREIGN PATENT DOCUMENTS

JP    5-229354    9/1993
(Continued)

OTHER PUBLICATIONS

International Search Report dated Sep. 9, 2008 issued in corresponding PCT Application No. PCT/JP2008/060355.

*Primary Examiner* — Kiley Stoner
(74) *Attorney, Agent, or Firm* — Kenyon & Kenyon LLP

(57) ABSTRACT

This manufacturing method of a fuel tank is for manufacturing a metallic fuel tank having a concavo-convex portion in a course of seam welding using a seam welder, wherein the seam welding is performed using the seam welder provided with a non-interfering space where interference with the fuel tank is avoided, while changing the position of the fuel tank relative to the seam welder.

10 Claims, 11 Drawing Sheets

FOREIGN PATENT DOCUMENTS

| | | | |
|---|---|---|---|
| JP | 06-114560 A | * | 4/1994 |
| JP | 7-241684 | | 9/1995 |
| JP | 8-174227 | | 7/1996 |
| JP | 09-314344 A | * | 12/1997 |
| JP | 09-314345 | | 12/1997 |
| JP | 2002224842 A | * | 8/2002 |
| JP | 2002-292471 A | * | 10/2002 |
| JP | 2003-21012 | | 1/2003 |
| JP | 2005-066683 A | * | 3/2005 |
| JP | 2006-088166 A | * | 4/2006 |

* cited by examiner

MANUFACTURING METHOD OF FUEL TANK, AND FUEL TANK

TECHNICAL FIELD

The present invention relates to a manufacturing method of a fuel tank which manufactures metallic fuel tanks for automobiles having complicated shapes by seam welding. Moreover, the present invention relates to a fuel tank manufactured using the manufacturing method of a fuel tank.

This application is based on Japanese Patent Application No. 2007-151056, the content of which is incorporated herein by reference.

BACKGROUND ART

Various seam welding methods of metallic fuel tanks for automobiles have conventionally been proposed. For example, the following Patent Document 1 discloses a method of making a fuel tank supported by a multi-axial robot, and sandwiching and welding a flange portion for joining of a fuel tank between upper and lower electrode rings of a seam welder installed in place. In this method, the periphery of the flange portion for joining is continuously seam-welded while the posture of the fuel tank is rotated. Thereby, complicated jigs can be made unnecessary, fuel tanks of different shapes can also be coped with easily, and wear of the lower electrode ring can be automatically corrected in a follow-up manner.

Further, the following Patent Document 2 discloses a seam welding line copying automatic apparatus in which an XY table which is a supporting device of a fuel tank which permits horizontal movement, but constrains a motion in a horizontal turning direction, and a copying control shaft having a main shaft in a direction orthogonal to a movement permissible direction of this XY table are superposed up and down. In this seam welding line automatic copying apparatus, expensive copying jigs required for seam welding, complicated programs for robots which support workpieces, etc. are made unnecessary.

Patent Document 1: Japanese Unexamined Patent Application, First Publication No. H07-241684
Patent Document 2: Japanese Unexamined Patent Application, First Publication No. H09-314345

DISCLOSURE OF THE INVENTION

Problems that the Invention is to Solve

Meanwhile, in the body design of an automobile, the arrangement of a fuel tank is often determined in a final design phase of an instrument arrangement, from the viewpoint that the space in the vehicle needs to be used effectively. Further, as the fuel tank, in order to reduce the number of times of fueling, the capacity of the fuel tank is required to be made large within a range which is permitted in design. Due to these circumstances, it is required that the fuel tank is arranged while utilizing without leaving the space in the vehicle remaining in the final design phase of an instrument arrangement. Therefore, the shape of the fuel tank tends to be complicated. This type of metallic fuel tank mostly have sealed structure in which two metallic sheet panels subjected to deep drawing are superposed on each other, and are then seam-welded using a seam welder. For example, a seam welder 201 shown in FIG. 20 has conventionally been used.

The seam welder 201 includes a pair of electrode rings 202, and sandwiches edge portions (welded portions) of metallic sheet panels 203 after the deep drawing between the electrode rings 202, and applies a current to between the pair of electrode rings 202, thereby performing seam welding of the edge portions. In this case, the electrode rings 202 are fixed in place, and the metallic sheet panels 203 are rotated according to the status of welding, so that seam welding can be continuously performed on the whole peripheries of the panels.

In this case, if the shape of the fuel tank is relatively simple, a problem does not occur particularly. However, in recent years, the shape of the fuel recently tends to be complicated due to the aforementioned reason. Therefore, a problem as shown in this drawing occurs easily. That is, in a case where edge portions of a fuel tank 204 having a concavo-convex shape are continuously seam-welded, the fuel tank 204 whose posture is controlled according to the status of welding may bump against a welder body 205 or the electrode rings 202, and thus continuation of seam welding may become impossible.

This problem will be described in more detail with reference to FIGS. 1 and 2. For example, a case where a cross-shaped fuel tank 1 as shown in the plan view of FIG. 2 is seam-welded is considered. In this case, normally, welding is preferably made along an usual route of A→B→C→D→E→F→G→H→I→J→K→L→A according to numbers marked at respective apexes of the cross. However, in a case where the aforementioned conventional seam welder is used, if welding along a usual route of A→C→D→F→G→I→J→L→A without passing through B, E, H, and K is not made, there is a possibility in that the fuel tank 1 excessively approaches and contacts the welder body 205 when welding of A→B, D→E, G→H, and J→K is made. Consequently, welding had to be made so that the circumferential length of seam welding might become a minimum, without passing through an inverse portion (depressed portion).

As a proposal for avoiding such a problem, adopting a fuel tank of a simple shape in which an inverse portion was eliminated was also considered. In that case, however, it was necessary to re-evaluate the shape so as to fit into the space in the vehicle. As a result, the shape of a smaller capacity than an original capacity had to be adopted. Consequently, it was difficult to manufacture metallic fuel tanks of complicated shapes having inverse structure.

This problem was also the same in cases where the apparatus and method disclosed in the aforementioned Patent Document 1 and Patent Document 2 were used. That is, the apparatus and method were not suitable for fuel tanks of such complicated shapes that the fuel tanks contact a welder body during seam welding, and could not manufacture only fuel tanks of simple shapes.

In addition, in order to realize fuel tanks having complicated shapes, it is also considered that resin instead of metallic sheets is adopted as the material for the fuel tanks, and manufacture is made by injection molding. Meantime, in these days, the technology of using bioethanol as the fuel for automobiles is being developed briskly, and the bioethanol has the possibility to greatly serve as the fuel for automobiles in future. However, the above fuel tanks made of resin are said to have less anti-fuel permeability against bioethanol than gasoline. Accordingly, it can be said that the fuel tanks made of resin are unsuitable as a bioethanol container, and the metallic fuel tanks is more preferable.

The present invention has been made in view of the above situations, and has an object of providing a manufacturing method of a fuel tank which makes it possible to manufacture metallic fuel tanks having complicated shapes, and a fuel tank manufactured by the manufacturing method of a fuel tank.

Means for Solving the Problems

The present inventors have adopted the followings in order to solve the above problems, and thereby achieving the above object.

(a) A manufacturing method of a fuel tank according to a first aspect of the present invention is a manufacturing method of a fuel tank of manufacturing a metallic fuel tank having a concavo-convex portion in a course of seam welding using a seam welder, wherein the seam welding is performed using the seam welder provided with a non-interfering space where interference with the fuel tank is avoided, while changing the position of the fuel tank relative to the seam welder.

(b) In the manufacturing method of a fuel tank according to the above (a), a depth d of the non-interfering space from a seam welding point may be set to be larger than a maximum dimension Lmax of the concavo-convex portion of the fuel tank.

(c) In the manufacturing method of a fuel tank according to the above (b), in a case where an inverse angle is greater than 90 degrees and is smaller than 180 degrees in a concave portion which is an inverse area of the fuel tank, a maximum dimension Lmax of inverse sides is obtained by the following Expression (1), $$L\text{max} = \text{Length of } BC' \times \sin(90° - \theta_1) - \text{Length of } CC' \times \sin(\theta_1 + \theta_2) \quad (1)$$

where a shortest straight line among two straight lines connecting an inverse point and two inverse start points; and two straight lines connecting an imaginary inverse point and each of the inverse start points is defined as a straight line a, a straight line connecting the inverse start point having a sharing relation with the straight line a, and the imaginary inverse point is defined as a straight line b, an angle between the straight line a and the straight line b is defined as $\theta_1$, an angle between a straight line c connecting the inverse point and the imaginary inverse point, and the straight line b is defined as $\theta_2$, the point of the inverse start points which is far from the imaginary inverse point is defined as a B point, the inverse point is defined as a C point, and the imaginary inverse point is defined as C'.

(d) In the manufacturing method of a fuel tank according to the above (b), in a case where a welding inverse angle is greater than 90 degrees and is smaller than 180 degrees in a concave portion which is an inverse area of the fuel tank, a maximum dimension Lmax of inverse sides is obtained by the following Expression (2), $$L\text{max} = \text{Length of } BC' \times \sin(90° - \theta_1') - \text{Length of } C'C'' \times \sin(\theta_1' + \theta_2') \quad (2)$$

where a shortest straight line among two straight lines connecting a welding inverse point and two inverse start points; and two straight lines connecting an imaginary inverse point and each of the inverse start points is defined as a straight line a', a straight line connecting the inverse start point having a sharing relation with the straight line a', and the imaginary inverse point is defined as a straight line b, an angle between the straight line a' and the straight line b is defined as $\theta_1'$, an angle between a straight line c' connecting the welding inverse point and the imaginary inverse point, and the straight line b is defined as $\theta_2'$, the point of the inverse start points which is far from the imaginary inverse point is defined as a B point, the imaginary inverse point is defined as a C' point, and the welding inverse point is defined as C''.

(e) In the manufacturing method of a fuel tank according to the above (b), in a case where BCDEFG which is provided in the fuel tank, includes an inverse area, and forms a concave portion formed by connected straight lines, when: an angle α between an inverse side CD including a C point as an inverse start point, and a non-inverse side BC before reaching the C point is greater than 90 degrees and is smaller than 180 degrees; and an angle β between an inverse side EF including an F point as an inverse start point, and a non-inverse side FG after reaching the F point is greater than 90 degrees and is smaller than 180 degrees, the maximum dimension Lmax of inverse sides is obtained by the following Expression (3), $$L\text{max} = \text{Length of } CG \times \sin \alpha, \text{ or } L\text{max} = \text{Length of } BF \times \sin \beta \quad (3)$$

where an inflection point in an extension direction headed to the C point as seen from the F point is defined as a B point, and an inflection point in an extension direction headed to the F point as seen from the C point is defined as a G point.

(f) In the manufacturing method of a fuel tank according to the above (b), in a case where BCDEFG which is provided in the fuel tank, includes an inverse area, and forms a concave portion formed by connected straight lines, when: an angle α' between a non-inverse side BC before reaching a C point as an inverse start point, and a welding line after passing through the C point is greater than 90 degrees and is smaller than 180 degrees; and an angle β' between a non-inverse side FG after reaching an F point as an inverse start point, and a welding line after passing through the F point is greater than 90 degrees and is smaller than 180 degrees, the maximum dimension Lmax of inverse sides is obtained by the following Expression (4), $$L\text{max} = \text{Length of } CG \times \sin \alpha', \text{ or } L\text{max} = \text{Length of } BF \times \sin \beta' \quad (4)$$

where an inflection point in an extension direction headed to the C point as seen from the F point is defined as a B point, and an inflection point in an extension direction headed to the F point as seen from the C point is defined as a G point.

(g) In the manufacturing method of a fuel tank according to above (a), the planar shape of the fuel tank may be any one of a cross shape, a convex shape, a concave shape, an L shape, an E shape, an H shape, and a C shape.

(h) In the manufacturing method of a fuel tank according to the above (a), the seam welding may be performed using electrode rings having an external diameter of 150 mm or less.

(i) A fuel tank of the invention is manufactured by the manufacturing method of a fuel tank according to the above (a).

(j) A manufacturing method of a fuel tank according to a second aspect of the invention is a manufacturing method of a fuel tank of manufacturing a metallic fuel tank having a welded portion therein in plan view using a seam welder. The seam welding is performed using the seam welder provided with a non-interfering space where interference with the fuel tank is avoided while the position of the fuel tank relative to the seam welder is changed.

(k) In the manufacturing method of a fuel tank according to the above (j), the planar shape of the fuel tank is a doughnut shape or a hollow shape.

(l) A fuel tank of the invention is manufactured by the manufacturing method of a fuel tank according to the above (j).

Advantages of the Invention

According to the manufacturing method of a fuel tank related to the first aspect of the invention, seam welding is performed using a seam welder provided with a non-interfering space, so that metallic fuel tanks having inverse structure, which conventionally interfere with the seam welder during the seam welding, can also be manufactured.

That is, in the case of the above (a) and (b), seam welding is performed using a seam welder provided with the non-interfering space, so that it can be avoided that the fuel tank contacts wall surfaces of the seam welder during the seam welding.

Further, in the case of above (c) or (d), the inverse angle or the welding inverse angle is made greater than 90 degrees and smaller than 180 degrees in a concave portion, so that a required maximum dimension Lmax of inverse sides can be obtained by the above Expression (1) or the above Expression (2). Consequently, it can be avoided that the maximum dimension Lmax is set be larger than needed.

Further, in the case of above (e) or (f), the angle α between an inverse side and a non-inverse side is made greater than 90 degrees and smaller than 180 degrees in a concave portion, so that a required maximum dimension Lmax of inverse sides can be obtained by the above Expression (3) or the above Expression (4). Consequently, it can be avoided that the maximum dimension Lmax is set be larger than needed.

Further, in the case of the above (g), the planar shape of the fuel tank is any one of a cross shape, a convex shape, a concave shape, an L shape, an E shape, an H shape, and a C shape. Thus, the invention can be applied to fuel tanks having various complicated shapes.

Further, in the case of the above (h), seam welding is performed using electrode rings having an external diameter of 150 mm or less, so that the case where the electrode rings and wall portions other than seam-welded portions of the fuel tank contact each other during the seam welding can be reduced.

Further, since the fuel tank described in the above (i) is manufactured by the manufacturing method of a fuel tank described in the above (a), fuel tanks of complicated shapes having inverse structure can be provided.

Further, according to the manufacturing method of a fuel tank related to the second aspect of the invention, seam welding is performed using a seam welder provided with a non-interfering space, so that metallic fuel tanks having inverse structure, which conventionally interfere with the seam welder during the seam welding, can also be manufactured.

That is, in the case of the above (j) and (k), seam welding is performed using a seam welder provided with a non-interfering space, so that it can be avoided that the fuel tank contacts wall surfaces of the seam welder during the seam welding.

Further, since the fuel tank described in the above (l) is manufactured by the manufacturing method of a fuel tank described in the above (j), hollow or doughnut-shaped fuel tanks having inverse structure, can also be provided.

Figure 1:
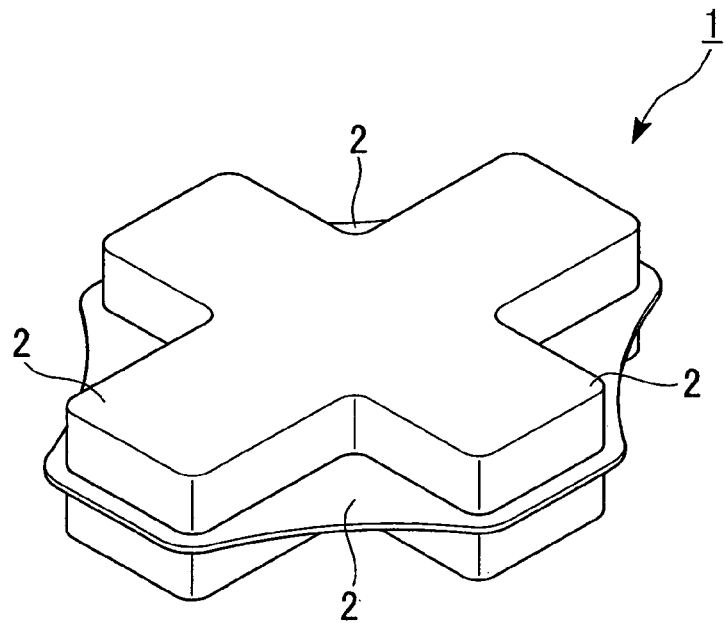
FIG. 1 is a perspective view showing one embodiment of a cross-shaped fuel tank of the invention.

REFERENCE NUMERALS 1, 10, 24, 30, 40, 50, 60, 90, 100: fuel tank
21: electrode ring
2: inverse surface
3: inverse side
4: inverse point
5: inverse angle
6: inverse start point
7: imaginary inverse point
8: welding inverse point
9: welding inverse angle

BEST MODE FOR CARRYING OUT THE INVENTION

Respective embodiments of a manufacturing method of a fuel tank and a fuel tank according to the present invention will be described below, referring to the drawings. In the invention, a method of manufacturing a metallic fuel tank of a complicated shape, which has inverse structure to be described below, by seam welding, and a fuel tank obtained by this method are provided.

<Definitions of Inverse Structure and Inverse Sides>

Figure 2:
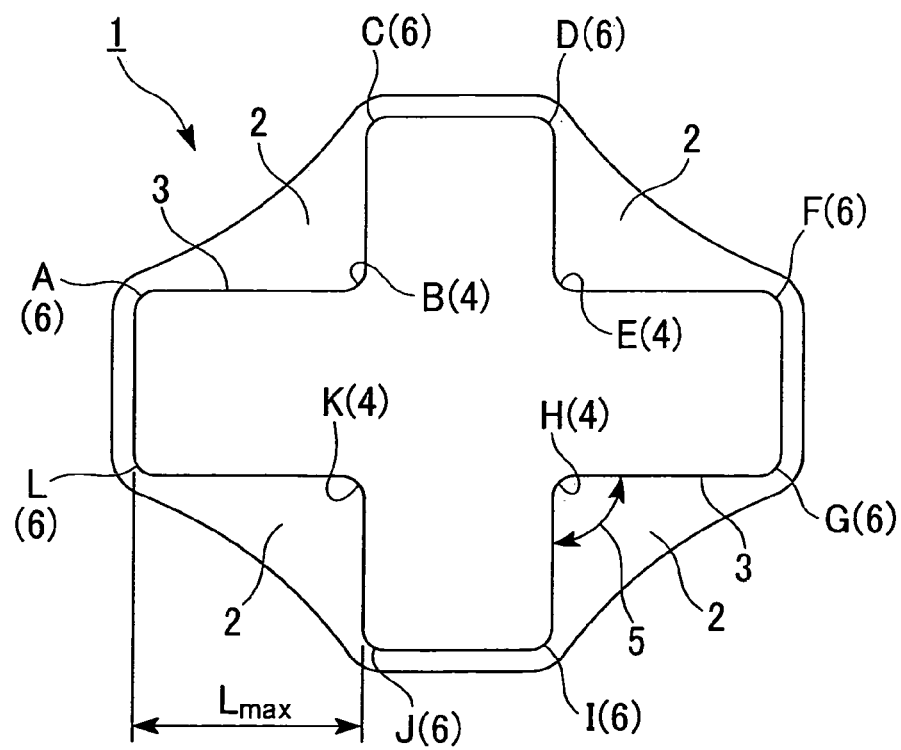
FIG. 2 is a plan view of the above fuel tank.

About the definitions of the inverse structure and the inverse sides in the invention, a cross-shaped fuel-tank 1, etc. shown in FIGS. 1 and 2 will be described as an example.

In the invention, a fuel tank having such a complicated shape that the fuel tank enters a fuel tank entrance prohibition area (referred to as an inverse area or a negative corner) behind an electrode ring of a seam welder (not shown; for example, a horizontal seam welder) during seam welding is referred to as "a fuel tank having inverse structure." Moreover, in a case where seam welding is performed inside a line which connects the shortest circumferential length of seam welding, this area is defined an inverse surface 2, respective sides within the inverse surface 2 are defined as inverse sides 3, and an inflection point within each inverse surface 2 is defined as an inverse point 4.

Figure 6:
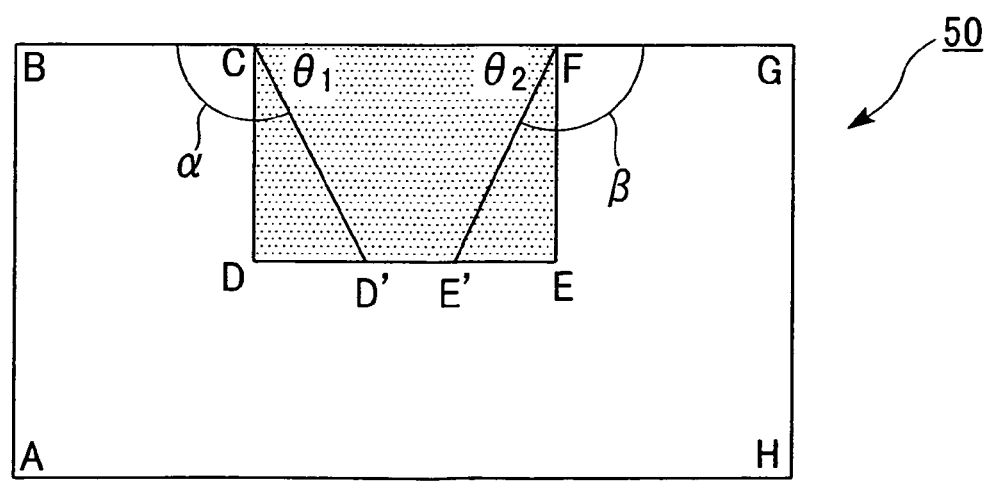
FIG. 6 is a plan view of a concave fuel tank of the invention.

Moreover, the angle of each inverse point 4 is defined as an inverse angle 5. The inverse angle 5 means an angle between wall surfaces which is directed to the outside of the fuel tank 1 as seen from the inverse point 4, and is within a range from 90 degrees to 180 degrees in the example of this drawing. The inflection points (referring to FIG. 2, respective points of A, C, D, F, I, J, and L) corresponding to inlets of the inverse area are defined as inverse start points 6. In a case where the inverse angle 5 exceeds 90 degrees, an imaginary line where the inverse angle 5 becomes 90 degrees is drawn, and an inflection point based on this imaginary line is defined as an imaginary inverse point 7 (to be described later). The imaginary line is drawn at right angles to a side (referring to FIG. 3, respective sides of AB, DE, and GH) from an inverse start point 6 to another inverse start point 6, and referring to FIG. 4, the imaginary inverse point 7 becomes point C'. An inflection point of a line where the inside of the inverse area is welded is defined as a welding inverse point 8, and referring to FIG. 4, for example, this inflection point becomes C". The angle between imaginary lines in the welding inverse point 8 is defined as the welding inverse angle 9. A concave portion of a concave fuel tank is also as shown in FIG. 6.

This idea can also be applied to, for example, a doughnut-shaped hollow fuel tank 10 shown in FIGS. 7 and 8, and can be defined as follows.

That is, in a conventional welder, only the outer peripheral side of the hollow fuel tank 10 could not be welded, and in a case where there is a welding line inside the tank, welding was difficult. Consequently, the side surface of the hollow fuel tank 10 is referred to as an inverse surface 11, and a line of an inner periphery of the hollow fuel tank 10 is referred to as an inverse side 12.

Figure 9:
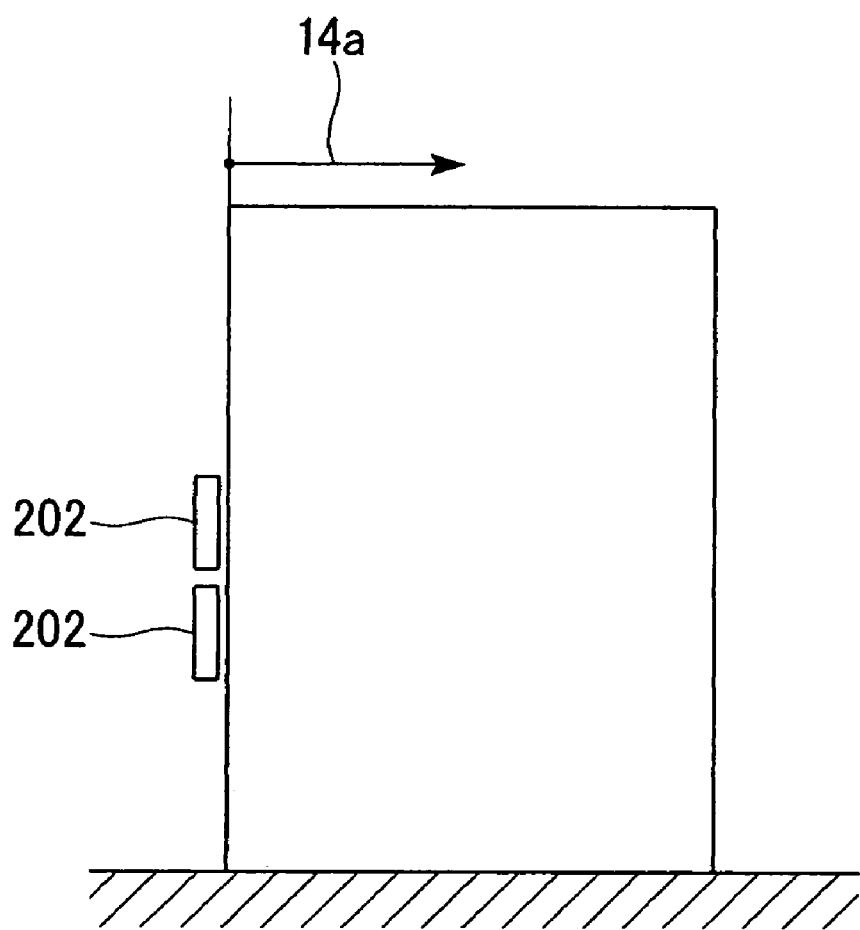
FIG. 9 is a side view for explaining problems of a conventional seam welder.

In a conventional seam welder, there was no pace closer to a main body of the welder than the electrode ring, and as shown in FIG. 9, and an area behind the electrode ring 13 was an area 14a which a fuel tank cannot enter. Therefore, during seam welding, only a fuel tank of simple structure where the fuel tank (not shown) does not contact a welder body 14 could be seam-welded.

Figure 10:
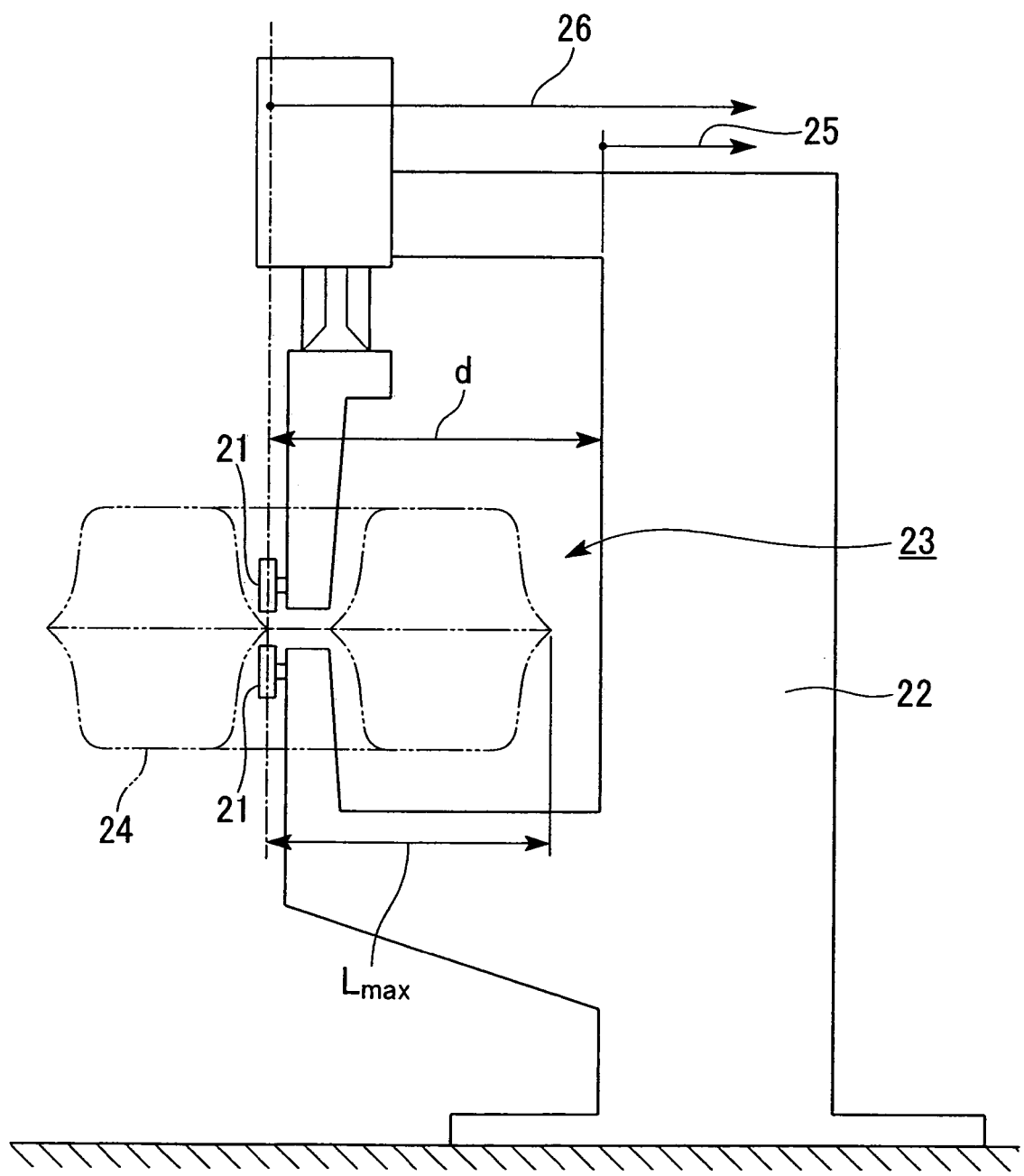
FIG. 10 is a side view of a seam-type welder used for the invention.
Figure 11:
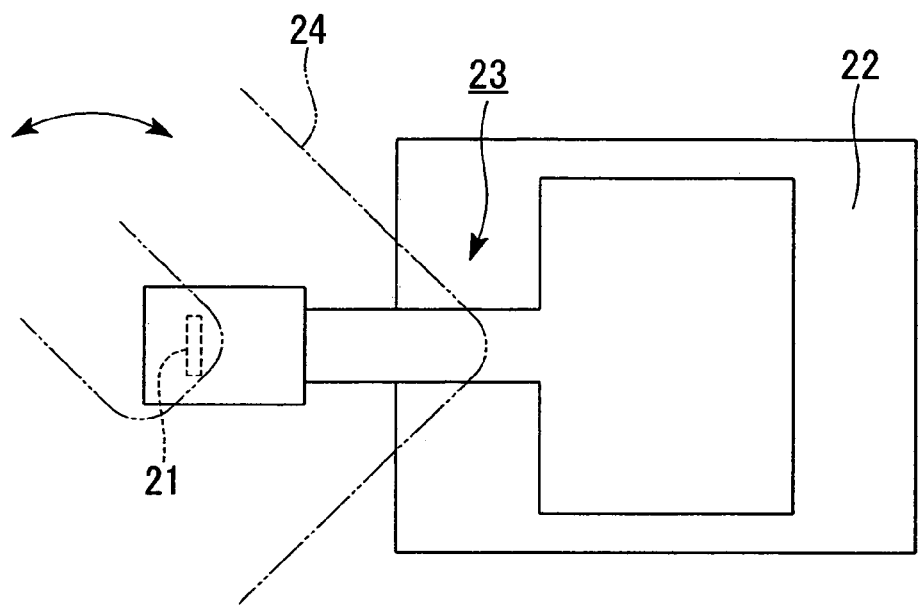
FIG. 11 is a plan view of the above seam-type welder.

Thus, in the invention, as shown in FIGS. 10 and 11, it is avoided that the fuel tank 24 under seam welding contacts the welder body 22 by providing a non-interfering space 23 closer to the welder body 22 than a pair of electrode rings 21. Thereby, a fuel tank entrance prohibition area 25 is moved to the rear side of the welder body 22, and seam welding of the inverse surface of the fuel tank 24, i.e., the surface which could not be welded conventionally, is made possible.

EMBODIMENT OF THE INVENTION

FIG. 10 is a side view showing an example of the horizontal seam welder used for the invention. In this drawing, reference numeral 22 represents a welder body of this horizontal seam welder, reference numeral 24 represents a fuel tank, and reference numeral 21 represents electrode rings. The electrode ring diameter of a pair of electrode rings 21 is R. Further, the horizontal seam welder of this embodiment is a wire seam welder, and the depth from the electrode rings 21 along the horizontal direction of the non-interfering space 23 is defined as d.

The manufacturing method of a fuel tank of this embodiment is a manufacturing method of a fuel tank having structure in which the fuel tank 24 under seam welding enters a rear area 26 (conventionally, an area which the fuel tank 24 could not enter) of the welder body 22, and performs seam welding, using the horizontal seam welder having the non-interfering space 23 where entrance of the fuel tank 24 is accepted.

The horizontal seam welder of this embodiment is a welder in which both side surfaces of a seam-welded portion are arranged between a pair of electrode rings 21, and which is arranged such that weld beads becomes horizontal.

The inverse structure in this embodiment means the structure of a fuel tank having a complicated shape in which the fuel tank 24 whose posture is controlled during seam welding enters the area 26 behind each of the electrode rings 21 of the horizontal seam welder.

During seam welding, the fuel tank 24 is rotated in the direction of an arrow of FIG. 11. At this time, conventionally, continuation of the seam welding was difficult since the fuel tank 24 contacts the welder body 22. In this embodiment, however, the non-interfering space 23 which permits the fuel tank 24 to enter the rear area 26 is provided. Thus, the fuel tank 24 and the welder body 22 do not contact each other. Consequently, the fuel tank 24 of a complicated shape having inverse structure can be seam-welded continuously.

As shown in FIG. 10, the non-interfering space 23 is a space provided behind each of the electrode rings 21. It is preferable that the depth d be larger than the length Lmax of the maximum inverse side of the fuel tank 24.

The maximum inverse side of the fuel tank 24 means a side which is determined by the shape of the fuel tank 24, and a side with the same dimension as the maximum radius of rotation when the fuel tank 24 enters the non-interfering space 23 during seam welding.

It can be avoided that the fuel tank 24 contacts the welder body 22 during seam welding by making the depth d of the non-interfering space 23 provided on the side of the welder body 22 larger than the length Lmax of the maximum inverse side.

The depth d can be set like Expression (5) or Expression (6) to be described later by making an inverse angle or a welding inverse angle larger than 90 degrees. In this case, a required depth d can be suppressed to the minimum. In addition, the height of the non-interfering space 23 provided in the welder body 22 may be made larger than the height of the fuel tank 24 which enters the non-interfering space 23, and the width of the non-interfering space 23 may be made equal to the width of the welder body 22.

Further, the planar shape of the fuel tank to which the invention is applied can be applied to fuel tanks having various complicated shapes, regardless of any one of a cross shape, a convex shape, a concave shape, an L shape, an E shape, an H shape, and a C shape.

<Small-Diameter Electrode>

When inverse sides are welded, in order to avoid contact with each of the electrode rings 21 and the wall surfaces of the fuel tank 24, it is desirable to make the external diameter of the electrode rings 21 smaller than a predetermined dimension as much as possible. In a case where the external diameter of the electrode rings 21 is larger than a predetermined dimension, the width of a welded flange of the fuel tank 24 should be increased.

Figure 12:
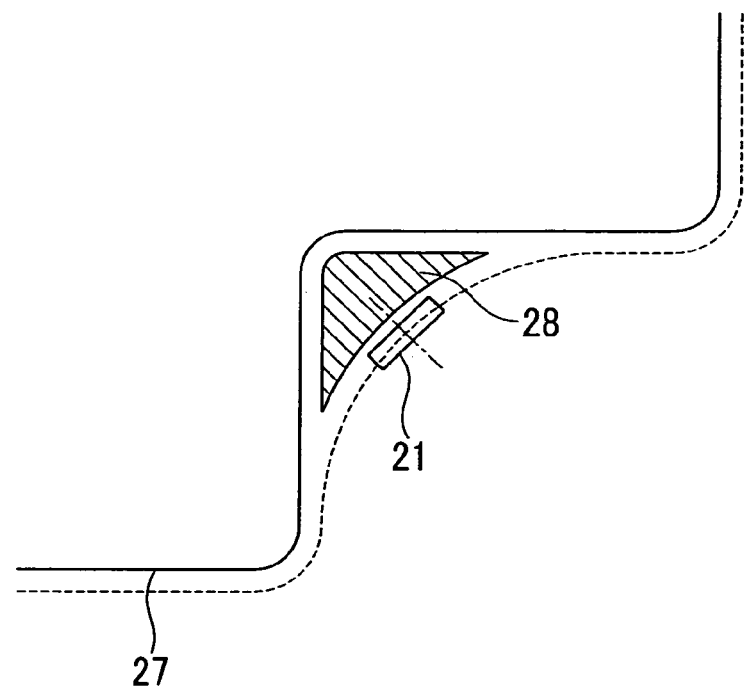
FIG. 12 is a partially enlarged view showing an inverse point peripheral portion in the fuel tank of the invention.

This will be described taking a case where the periphery of the inverse point of an L-shaped fuel tank 27 shown in FIG. 12 is welded as an example.

As shown in this drawing, in a case where each of the electrode rings 21 has a larger external diameter than a predetermined dimension, the wall surfaces of the fuel tank 27 cannot be approached. As a result, the inverse surface 28 is created between the wall surfaces and each of the electrode rings 21. The creation of such an inverse surface 28 is not preferable from the viewpoint of effective use of the inner space of a vehicle. Consequently, it is more preferable that the external diameter of each of the electrode rings 21 is as small as possible. In this case, when the external diameter of each of the electrode rings 21 becomes small, the rotational frequency of an electrode when a unit length is welded increases, and damage to rotary parts of a drive system becomes premature. Moreover, in a case where the external diameter of each of the electrode rings 21 is increased, the size of a welded housing should also be made small accordingly. However, this becomes disadvantageous from the viewpoint of power feed, electrode pressure, and water cooling, and the minimum diameter of each of the electrode rings 21 is restricted naturally.

Although the external diameter of electrode rings of a typical welder is around 300 mm, in the invention, 150 mm or less is preferable, and if possible, a diameter of about 100 mm is recommended. As another problem of making a diameter smaller, damage of the electrode rings themselves can be considered. If the external diameter of the electrode rings is reduced to half, the rotational frequency required to weld a unit length is doubled, and wear of the electrode rings also becomes premature twice. When acceleration of such wear occurs, a remarkable change is expected to occur in a proper range of welding. Consequently, employment of a wire seam welder with no change of the external diameter of the electrode rings is recommended in the invention.

The mainstream of recent fuel tanks is a saddle-type tank (refer to FIGS. 13 and 14) which can save a space by wrapping a crankshaft arranged at a bottom of a vehicle body of an automobile. Even in a case where the saddle-type tank 30 is welded, as shown in FIG. 15, it is necessary to make the curvature R of a saddle larger than the external diameter of each of the electrode rings 21. Therefore, even in making the curvature R of the saddle small, making the diameter of the electrode rings 21 small is advantageous.

<Convex Fuel Tank>

Figure 3:
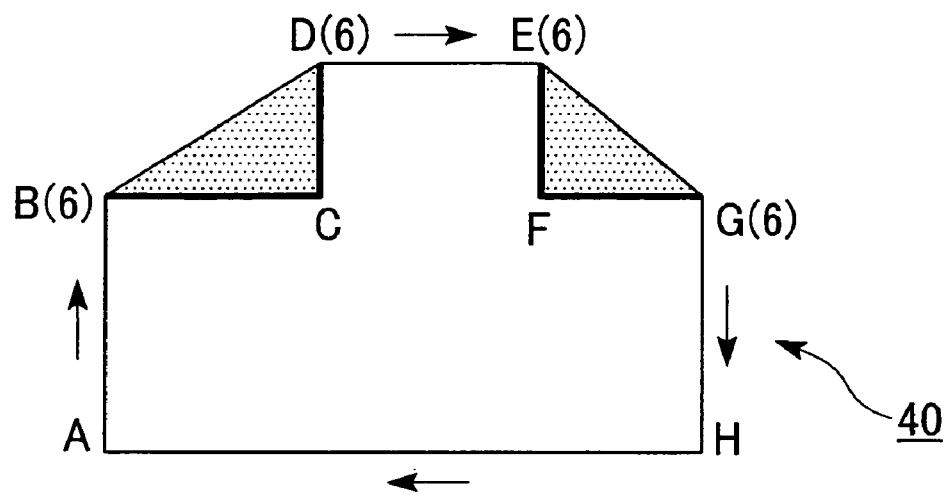
FIG. 3 is a plan view of a convex fuel tank of the invention.
Figure 4:
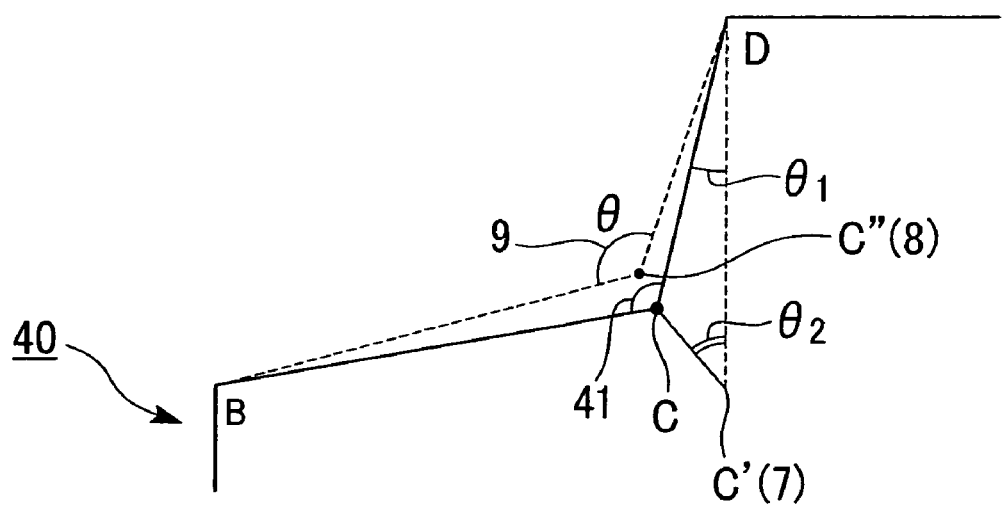
FIG. 4 is a partially enlarged view of the above convex fuel tank.
Figure 5:
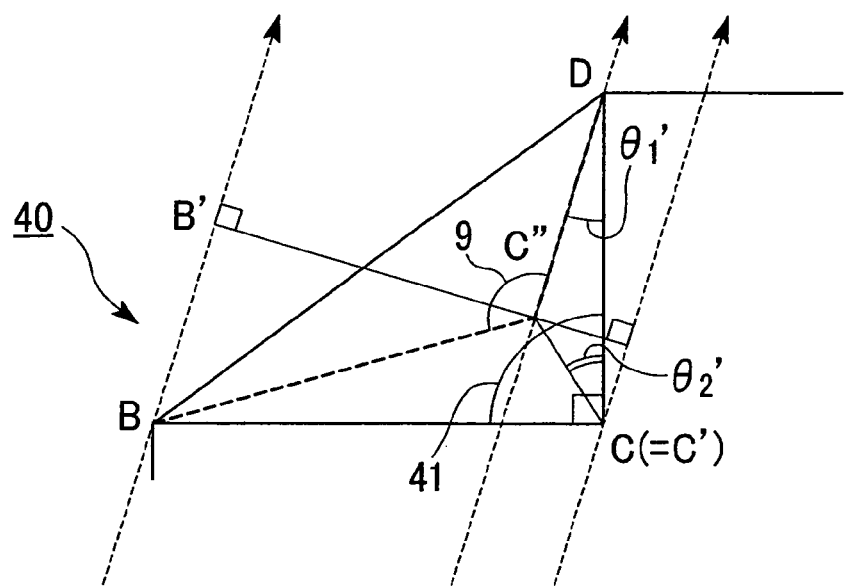
FIG. 5 is a partially enlarged view of the above convex fuel tank.

The aforementioned FIG. 3 is a plan view of the convex fuel tank 40, and FIGS. 4 and 5 are partially enlarged views of the convex fuel tank. FIG. 4 shows a case where the inverse angle 41 exceeds 90 degrees. Further, FIG. 5 shows case where the inverse angle 41 is 90 degrees, but the welding inverse angle 9 exceeds 90 degrees.

Generally, the seam welding of a metallic fuel tank is performed on a flange portion after an upper shell and a lower shell are superposed on each other. In the case of the convex fuel tank 40, when the sides of B-C-D and the sides of E-F-G which are shown in FIG. 3 are welded, the wall surfaces of the fuel tank 40 may contact each of the electrode rings 21. Consequently, the inverse sides of the convex fuel tank 40 are a line which connects B-C-D in FIG. 3, and a line which connects E-F-G.

These respective sides are designated as BC, CD, EF, and FG. Also, in a case where the longest side of these sides is defined as Lmax, welding can be made without contact of the fuel tank 40 on the welder body 22 if the depth d of the non-interfering space 23 satisfies d>Lmax. Once the welder body 22 is installed, change of its specification is difficult. Consequently, the shape of the fuel tank 40 should be designed in consideration of the given depth d of the non-interfering space 23 of the welder body 22. Then, the method of giving the curvature R to an inverse point will be described below.

FIG. 4 shows the part of B-C-D of FIG. 3 in an enlarged manner.

The path of B→C→D shown in FIG. 5 requires the depth d of the non-interfering space 23 most. Since passing through an inverse area is not made in a case where welding is made linearly to the position of a D point from the position of a B point, the non-interfering space 23 is unnecessary. An intermediate instance of the welding is shown by dotted lines in FIG. 5. That is, in a case where welding is made such that the inverse angle is larger than 90 degrees, and the position of a D point is reached through a C" point from a B point, a required depth d of the non-interfering space 23 is expressed like the following Expression (5). This is because, when transition of C"→D is made, the fuel tank 40 moves such that a B point is headed to a B' point.

$$\text{Length of } BC\text{'}\times\sin(90°-\theta_1)-\text{Length of } CC\text{'}\times\sin(\theta_1+\theta_2) \tag{5}$$

Further, this is also the same in a case where the welding inverse angle 9 is made larger than 90 degrees, and a required depth d of the non-interfering space 23 is expressed by the following Expression (6).

$$\text{Length of } BC\text{'}\times\sin(90°-\theta_1\text{'})-\text{Length of } C'C\text{''}\times\sin(\theta_1\text{'}+\theta_2\text{'}) \tag{6}$$

<Concave Fuel Tank>

A case where a concave fuel tank 50 shown in FIG. 6 is welded clockwise will be considered. In this case, the fuel tank 50 rotates in a circle drawn by a line which connects between a C point and a G point in the position of the C point, a circle drawn by a line which connects between a D point and a H point in the position of the D point, a circle drawn by a line which connects between an E point and an A point in the position of an E point, and a circle drawn by a line which connects between an F point and a B point in position of the F poi. If these lines are expressed as CG, DH, EA, and FB, it is necessary to make the depth d of the non-interfering space 23 larger than the maximum value Lmax of these lengths.

In a case where it is desired to shorten the depth d of the non-interfering space 23, it is only necessary to make the angle included in the inverse area larger than 90 degrees. That is, as shown in FIG. 6, welding is made toward D from C, but welding is made toward D' from C. If the angle of CD' to a BC side in that case is defined as α, the maximum dimension $L\max_{(C \to D')}$ is expressed by the following Expression (7).

$$L\max_{(C \to D')} = \text{Length of } CG \times \sin \alpha \tag{7}$$

Next, a case where the base of a concave portion in the fuel tank, i.e., a line which connects D' and E' of FIG. 6, is welded is considered. The maximum dimension $L\max_{(D' \to E')}$ in this case is determined by the depth of CD.

That is, the maximum dimension $L\max_{(D' \to E')}$ is uniquely determined by the following Expression (8).

$$\text{Length of } L\max_{(D' \to E')} = CD \tag{8}$$

Moreover, a case where even a line which connects E' and F is welded can also be considered similarly to the case where a line from C to D' is welded, and is determined by the following Expression (9).

$$L\max_{(E' \to F)} = \text{Length of } BF \times \sin \beta \tag{9}$$

Like the above description, in order to weld the concave portion, it is necessary to make the depth d of the non-interfering space 23 larger than the maximum value of the above $L\max_{(C \to D')}$, $L\max_{(D' \to E')}$, and $L\max_{(E' \to F)}$.

<Hollow Tank>

Figure 16:
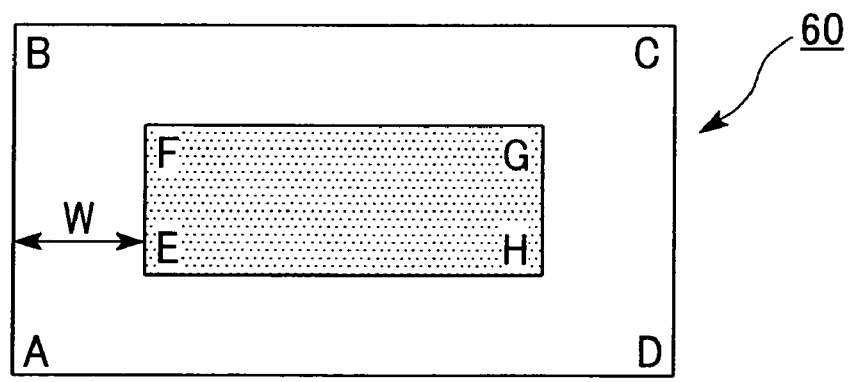
FIG. 16 is a plan view of the hollow fuel tank of the invention.

In the hollow tank 60 as shown in FIG. 16, the depth d of the non-interfering space 23 is determined by a corner portion. For example, the depth is determined by a linear distance which connects A point and E point. It is possible to give R to each of corner portions of A point and E point, thereby making the depth d of the non-interfering space 23 shallow up to the width W shown in this drawing.

In addition, in the case of the fuel tank 60, when a portion which connects H point from E point which is an inverse area, not only the electrode rings 21 but the housing should enter the inverse area. Consequently, the size of the housing is also influenced.

Furthermore, in order to make the electrode rings 21 put into the inverse area, it is necessary to open the upper and lower electrode rings 21 so as to become more than the height of the fuel tank 60 when the upper and lower electrodes rings are opened up and down.

EXAMPLES

Fuel tanks of various shapes were manufactured using the seam welder shown in FIGS. 10 and 11. DC or AC inverter-type wire seam welder was as the seam welder, and the depth d of the non-interfering space 23 and the external diameter of each of the electrode rings 21 were set as follows.
Depth d of non-interfering space 23: 700 mm
External diameter of electrode rings 21: 100 mm

Example 1

Convex Fuel Tank

Figure 17:
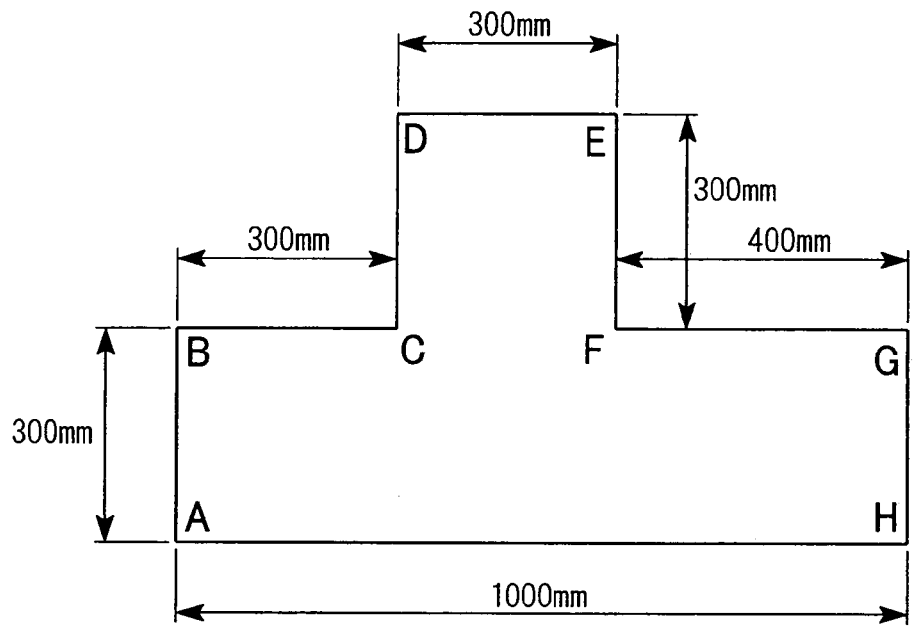
FIG. 17 is a plan view of the convex fuel tank of the invention.

A convex fuel tank 80 having a planar shape shown in FIG. 17 was manufactured.
The lengths of respective inverse sides were as follows.
AB=300 mm
BC=300 mm
CD=300 mm
EF=300 mm
FG=400 mm
Since the maximum dimension of these inverse sides was 400 mm, and the depth d of the non-interfering space 23 was 700 mm, the seam welding was possible. In addition, the seam flange surface had two-dimensional structure.

Example 2

Convex Fuel Tank

Figure 18:
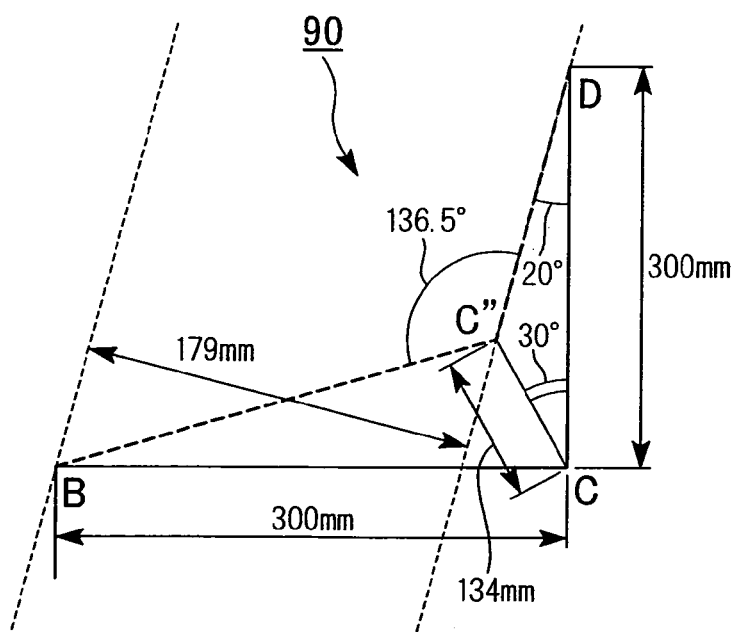
FIG. 18 is a partially enlarged view of the above convex fuel tank.

A convex tank 90 having a partial shape shown in FIG. 18 was manufactured.
The lengths of respective inverse sides are the same as those shown in FIG. 17. In addition, the welding inverse angle was set to 136.5 degrees.
From these, the value of the aforementioned Expression (6) is 300 mm×sin(90°−20°)−134 mm×sin(20°+30°)=179 mm Since the depth d of the non-interfering space 23 was 700 mm, the seam welding was possible. Further, even in a welder in which the depth d of the non-interfering space 23 is 200 mm, the seam welding was possible.

Example 3

Concave Fuel Tank

Figure 19:
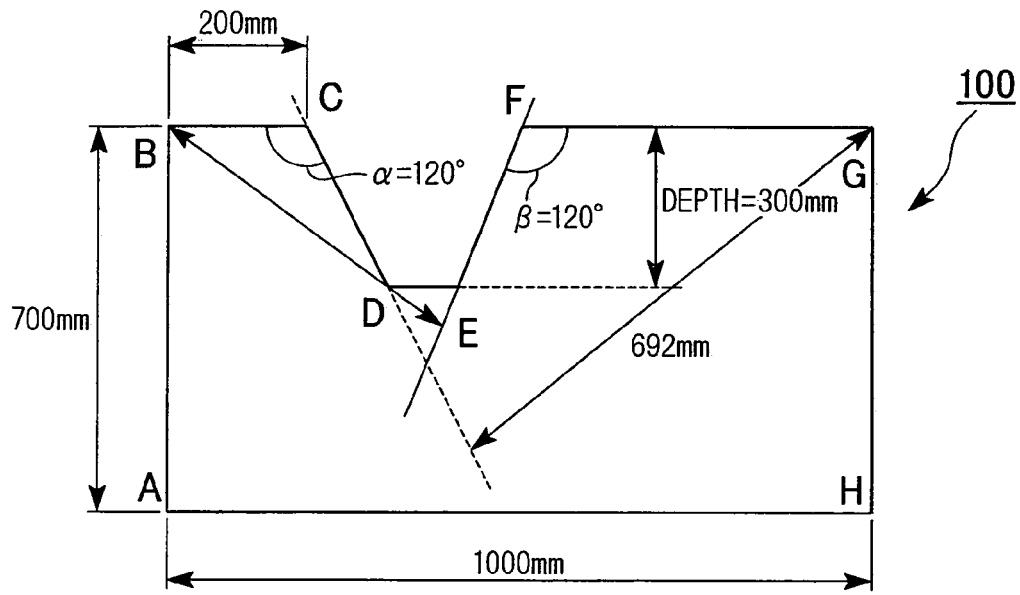
FIG. 19 is a plan view of a concave fuel tank of the invention.
Figure 20:
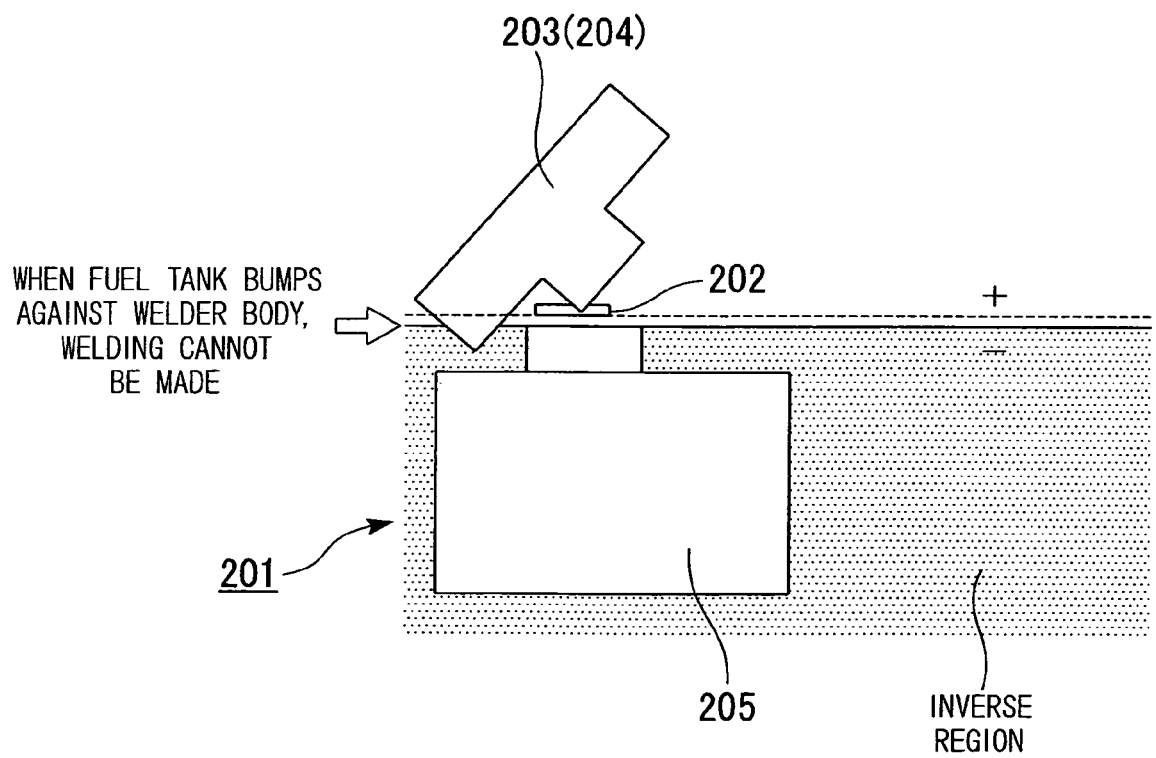
FIG. 20 is a plan view for explaining problems of a manufacturing method of a fuel tank using the conventional seam welder.

A concave fuel tank 100 having a planar shape shown in FIG. 19 was manufactured. The depth of a concave portion, i.e., an inverse area was 300 mm.
The angle α headed to D point of an inverse base through a C point from a B point was 120°. Moreover, the angle β headed to a G point through an F point from an E point was similarly 120°. From such conditions, the lengths of inverse sides are calculated as follows.
Maximum dimension Lmax at the time of welding of inverse inlet side (CD):

$CG \times \sin \alpha = 800$ mm×sin 120°=692 mm

Inverse depth: 300 mm

Maximum dimension Lmax at the time of welding of inverse outlet side (EF):

$BF \times \sin \beta c = 600$ mm×sin 120°=519 mm

Since the maximum dimension of these three lengths was 692 mm, and was shorter than 700 mm than the depth d of the non-interfering space 23 of the welder body, the manufacture was possible. In addition, the seam flange surface of the fuel tank 100 had two-dimensional structure.

Example 4

Concave Fuel Tank with Saddle Shape

Figure 13:
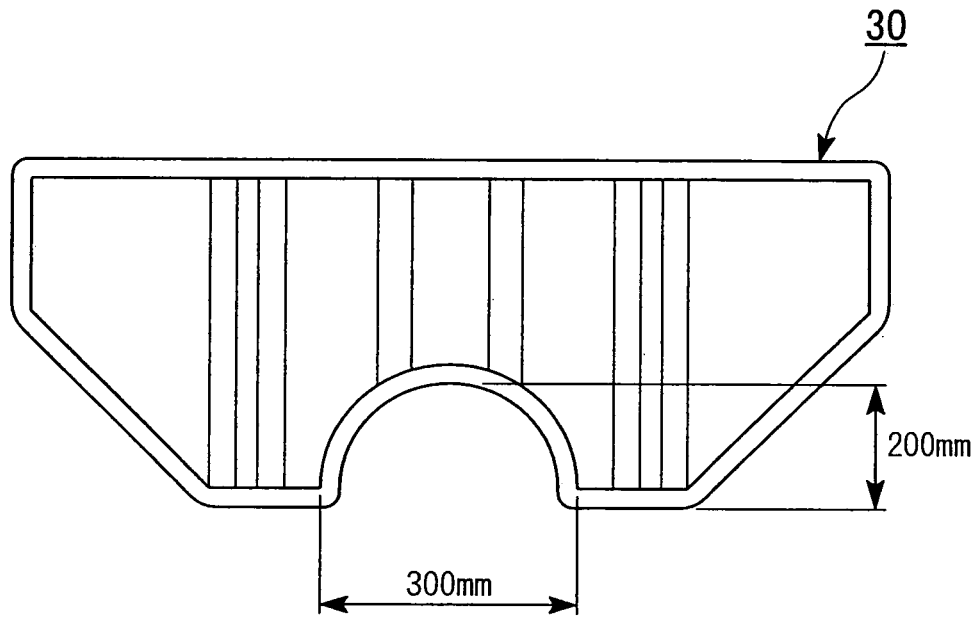
FIG. 13 is a plan view of a saddle-type fuel tank of the invention.
Figure 14:
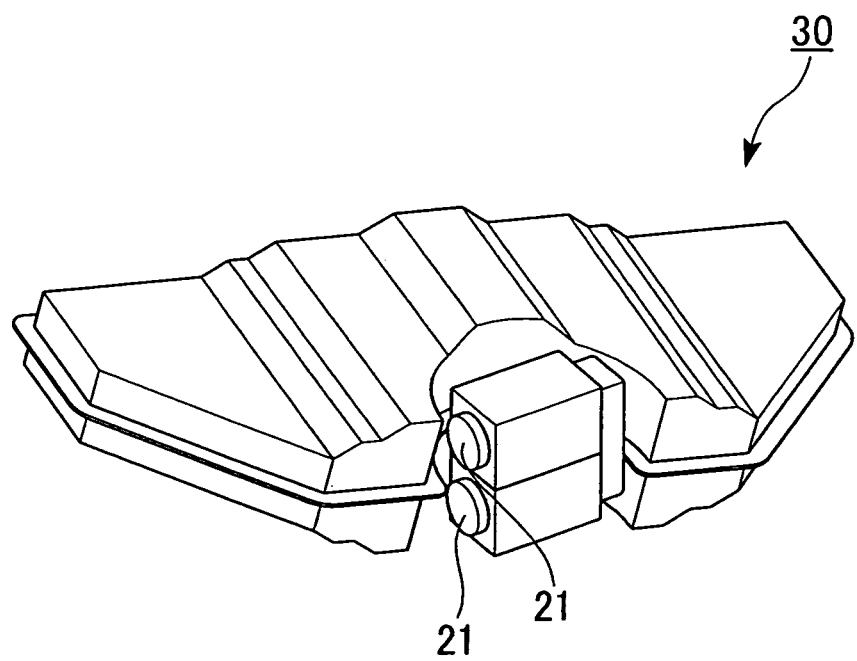
FIG. 14 is a perspective view of the above saddle-type fuel tank.
Figure 15:
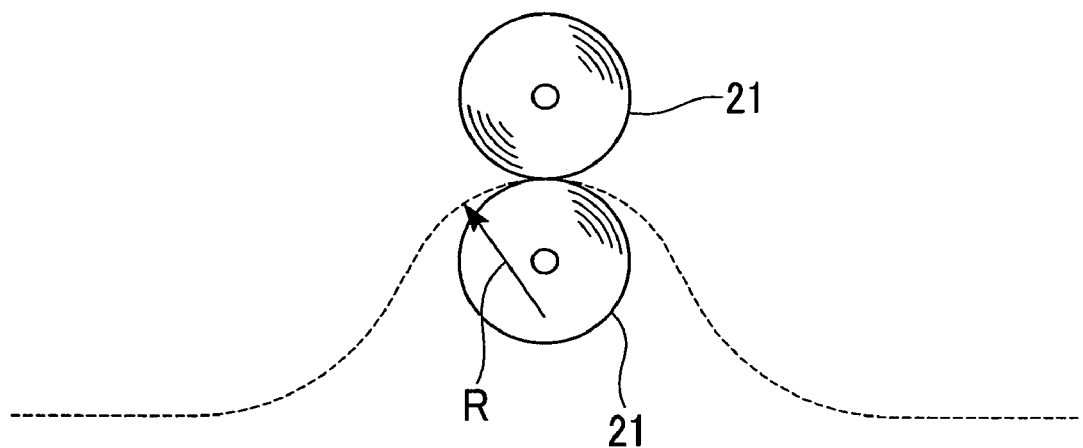
FIG. 15 is a partially enlarged view of the above saddle-type fuel tank.

The saddle-shaped concave fuel tank 30 shown in FIGS. 13 and 14 was manufactured.
The width of an inverse area was 300 mm; and the depth was 200 mm. In this case, a required depth d of the non-interfering space 23 is calculated as follows.

$CG=650$ mm

Inverse depth: 300 mm $BF=650$ mm

The length of the greatest inverse side was 700 mm, and welding was possible.

Example 5

Fuel Tank with Hollow Shape

Figure 7:
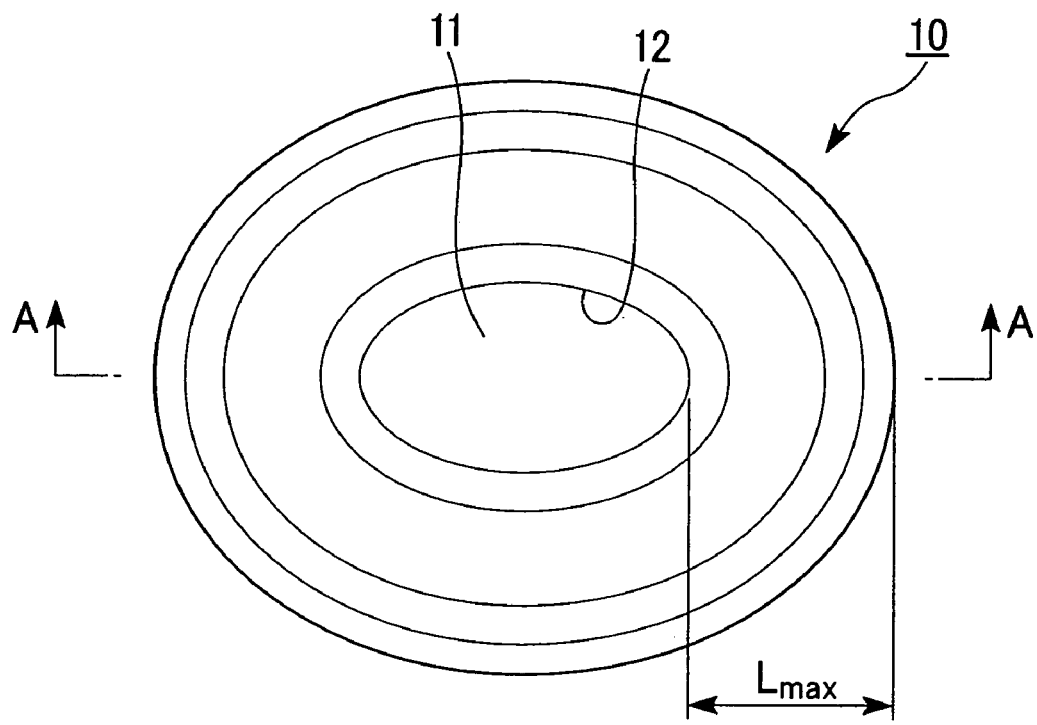
FIG. 7 is a plan view of a hollow fuel tank of the invention.
Figure 8:
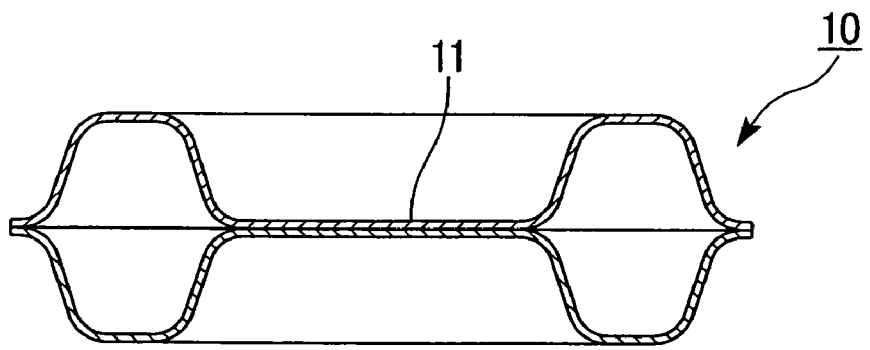
FIG. 8 is a sectional view taken along a line A-A of FIG. 7, showing the above hollow fuel tank.

The hollow (doughnut-shaped) fuel tank 10 shown in FIGS. 7 and 8 was manufactured.
The external dimension was 1000 mmφ, and the internal dimension was 600 mmφ. In the cross-section of a portion that fuel enters, the width was 200 mm, and the height was 100 mm. In the case of the fuel tank 10, a required depth d of the non-interfering space 23 was 200 mm. Thus, the manufacture was possible. Further, when the upper and lower electrode rings 21 were opened, a 150 mm gap was created between the electrode rings 21. Thus, the fuel tank 10 of 100 mm depth could be manufactured, and the effects of the invention were confirmed.

Although the preferable embodiment and examples of the invention have been described hitherto, the invention is not limited thereto. Additions, omissions, substitutions, and other alternations can be made without departing from the scope of the invention. The invention is not limited by the aforementioned description, and is limited only by the scope of the appended claims. For example, although the horizontal seam welder has been used in the above embodiment and examples, the invention is not limited to the horizontal seam welder, and other types of seam welders may be used.

INDUSTRIAL APPLICABILITY

In the invention, application scope of the seam welding which have conventionally been applied to fuel tanks of simple shapes with no inverse structure is expanded to fuel tanks of complicated shapes with inverse structure. This is very important in expanding utilization of metallic fuel tanks.

The invention claimed is:
1. A manufacturing method of a fuel tank for manufacturing a metallic fuel tank having a concavo-convex portion using a seam welder, comprising
performing seam welding using a seam welder provided with a welder body and a pair of electrode rings, wherein the seam welder has a non-interfering space between the welder body and the pair of electrode rings, said non-interfering space allowing entrance of the fuel tank during welding such that seam welding is performed continuously over said concavo-convex portion without interfering with the welder.

2. The manufacturing method of a fuel tank according to claim 1, wherein a depth d of the non-interfering space from a seam welding point is set to be larger than a maximum dimension Lmax of the concavo-convex portion of the fuel tank.

3. A method for manufacturing a metallic fuel tank having a concavo-convex portion using a seam welder, comprising performing seam welding using the seam welder,
   wherein the seam welder is provided with a welder body and a pair of electrode rings and has a non-interfering space between the welder body and the pair of electrode rings, said non-interfering space allowing entrance of the fuel tank during welding;
   wherein a depth d of the non-interfering space from a seam welding point is set to be larger than a maximum dimension Lmax of the concavo-convex portion of the fuel tank; and
   wherein an inverse angle is greater than 90 degrees and is smaller than 180 degrees in a concave portion which is an inverse area of the fuel tank,
   a maximum dimension Lmax of inverse sides is obtained by the following Expression (1), $$L\max = \text{Length of } BC' \times \sin(90° - \theta_1) - \text{Length of } CC' \times \sin(\theta_1 + \theta_2) \quad (1)$$

where a shortest straight line among two straight lines connecting an inverse point and two inverse start points; and two straight lines connecting an imaginary inverse point and each of the inverse start points is defined as a straight line a,
   a straight line connecting the inverse start point having a sharing relation with the straight line a, and the imaginary inverse point is defined as a straight line b,
   an angle between the straight line a and the straight line b is defined as $\theta_1$,
   an angle between a straight line c connecting the inverse point and the imaginary inverse point, and the straight line b is defined as $\theta_2$,
   the point of the inverse start points which is far from the imaginary inverse point is defined as a B point,
   the inverse point is defined as a C point, and
   the imaginary inverse point is defined as C'.

4. A method for manufacturing a metallic fuel tank having a concavo-convex portion using a seam welder, comprising performing seam welding using the seam welder,
   wherein the seam welder is provided with a welder body and a pair of electrode rings and has a non-interfering space between the welder body and the pair of electrode rings, said non-interfering space allowing entrance of the fuel tank during welding;
   wherein a depth d of the non-interfering space from a seam welding point is set to be larger than a maximum dimension Lmax of the concavo-convex portion of the fuel tank; and
   wherein
   a welding inverse angle is greater than 90 degrees and is smaller than 180 degrees in a concave portion which is an inverse area of the fuel tank,
   a maximum dimension Lmax of inverse sides is obtained by the following Expression (2)

$$L\max = \text{Length of } BC' \times \sin(90° - \theta_1') - \text{Length of } C'C'' \times \sin(\theta_1' + \theta_2') \quad (2)$$

where a shortest straight line among two straight lines connecting a welding inverse point and two inverse start points; and two straight lines connecting an imaginary inverse point and each of the inverse start points is defined as a straight line a',
   a straight line connecting the inverse start point having a sharing relation with the straight line a', and the imaginary inverse point is defined as a straight line b,
   an angle between the straight line a' and the straight line b is defined as $\theta_1'$,
   an angle between a straight line c' connecting the welding inverse point and the imaginary inverse point, and the straight line b is defined as $\theta_2'$,
   the point of the inverse start points which is far from the imaginary inverse point is defined as a B point,
   the imaginary inverse point is defined as a C' point, and
   the welding inverse point is defined as C''.

5. A method for manufacturing a metallic fuel tank having a concavo-convex portion using a seam welder, comprising performing seam welding using the seam welder,
   wherein the seam welder is provided with a welder body and a pair of electrode rings and has a non-interfering space between the welder body and the pair of electrode rings, said non-interfering space allowing entrance of the fuel tank during welding;
   wherein a depth d of the non-interfering space from a seam welding point is set to be larger than a maximum dimension Lmax of the concavo-convex portion of the fuel tank; and
   wherein
   BCDEFG which is provided in the fuel tank, includes an inverse area, and forms a concave portion formed by connected straight lines, when: an angle $\alpha$ between an inverse side CD including a C point as an inverse start point, and a non-inverse side BC before reaching the C point is greater than 90 degrees and is smaller than 180 degrees; and an angle $\beta$ between an inverse side EF including an F point as an inverse start point, and a non-inverse side FG after reaching the F point is greater than 90 degrees and is smaller than 180 degrees,
   the maximum dimension Lmax of inverse sides is obtained by the following Expression (3), $$L\max = \text{Length of } CG \times \sin \alpha, \text{ or } L\max = \text{Length of } BF \times \sin \beta \quad (3)$$

where an inflection point in an extension direction headed to the C point as seen from the F point is defined as a B point, and
   an inflection point in an extension direction headed to the F point as seen from the C point is defined as a G point.

6. A method for manufacturing a metallic fuel tank having a concavo-convex portion using a seam welder, comprising performing seam welding using the seam welder,
   wherein the seam welder is provided with a welder body and a pair of electrode rings and has a non-interfering space between the welder body and the pair of electrode rings, said non-interfering space allowing entrance of the fuel tank during welding;
   wherein a depth d of the non-interfering space from a seam welding point is set to be larger than a maximum dimension Lmax of the concavo-convex portion of the fuel tank; and
   wherein
   BCDEFG which is provided in the fuel tank, includes an inverse area, and forms a concave portion formed by connected straight lines, when: an angle $\alpha'$ between a non-inverse side BC before reaching a C point as an inverse start point, and a welding line after passing through the C point is greater than 90 degrees and is smaller than 180 degrees; and an angle β' between a non-inverse side FG after reaching an F point as an inverse start point, and a welding line after passing through the F point is greater than 90 degrees and is smaller than 180 degrees, the maximum dimension Lmax of inverse sides is obtained by the following Expression (4), $$L\text{max}=\text{Length of }CG\times\sin\alpha', \text{ or } L\text{max}=\text{Length of }BF\times\sin\beta' \tag{4}$$

where an inflection point in an extension direction headed to the C point as seen from the F point is defined as a B point, and an inflection point in an extension direction headed to the F point as seen from the C point is defined as a G point.

7. The manufacturing method of a fuel tank according to claim 1, wherein the planar shape of the fuel tank is anyone of a cross shape, a convex shape, a concave shape, an L shape, an E shape, an H shape, and a C shape.

8. The manufacturing method of a fuel tank according to claim 1, wherein the seam welding is performed using electrode rings having an external diameter of 150 mm or less.

9. A manufacturing method of a fuel tank for manufacturing a metallic fuel tank having a welded concavo-convex portion in plan view therein using a seam welder, comprising performing seam welding using a seam welder provided with a welder body and a pair of electrode rings, wherein the seam welder has a non-interfering space between the welder body and the pair of electrode rings, said non-interfering space allowing entrance of the fuel tank during welding such that seam welding is performed continuously over said concavo-convex portion without interfering with the welder.

10. The manufacturing method of a fuel tank according to claim 9, wherein the planar shape of the fuel tank is a doughnut shape or a hollow shape.

* * * * *